(12) United States Patent
Eastoe et al.

(10) Patent No.: US 10,096,406 B2
(45) Date of Patent: Oct. 9, 2018

(54) PENETRATOR DEVICE FOR HIGH PRESSURE APPLICATION

(71) Applicant: Siemens Aktiengesellschaft, Munich (DE)

(72) Inventors: Andrew Robert Eastoe, Urangsvaeg (NO); Hans Knutsson, Stord (NO); Johannes Vikane, Rubbestadneset (NO)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 15/602,165

(22) Filed: May 23, 2017

(65) Prior Publication Data

US 2017/0345532 A1 Nov. 30, 2017

(30) Foreign Application Priority Data

May 30, 2016 (EP) .................................... 16171939

(51) Int. Cl.
*H01R 13/40* (2006.01)
*H01B 17/30* (2006.01)
(Continued)

(52) U.S. Cl.
CPC ............. *H01B 17/305* (2013.01); *H02G 3/22* (2013.01); *H02G 9/00* (2013.01)

(58) Field of Classification Search
CPC ........... H01B 17/305; H02G 3/22; H02G 9/00
(Continued)

(56) References Cited

U.S. PATENT DOCUMENTS

| 2,700,140 A | * | 1/1955 | Phillips | H01R 9/032 |
| | | | | 174/77 R |
| 3,520,989 A | * | 7/1970 | Matthews | G21C 17/116 |
| | | | | 174/151 |

(Continued)

FOREIGN PATENT DOCUMENTS

EP 0598136 A1 5/1994

OTHER PUBLICATIONS

Extended European Search Report dated Sep. 7, 2016.
Office Action for European Patent Application No. 16171939.8 dated Aug. 21, 2018.

*Primary Examiner* — Abdullah Riyami
*Assistant Examiner* — Vladimir Imas
(74) *Attorney, Agent, or Firm* — Harness, Dickey & Pierce, P.L.C.

(57) ABSTRACT

A penetrator assembly, for high pressure and/or subsea applications, includes a body. The body includes a first end surface, in operation subject to a pressure of a high pressure environment; a second end surface distanced from the first end surface, which in operation is subject to a pressure of a low pressure environment; at least one connecting passage connecting the first end surface to the second end surface; at least one groove extending from the first end surface towards the second end surface, being distanced from second end surface and surrounding the connecting passage and including an annular opening on the first end surface; and annular lips between a first portion of connecting passage adjacent to the first end surface and the groove, the annular lips in operation being subject to the pressure of the high pressure environment and providing a pressure balance around the first portion of connecting passage.

19 Claims, 4 Drawing Sheets

(51) Int. Cl.
*H02G 9/00* (2006.01)
*H02G 3/22* (2006.01)

(58) Field of Classification Search
USPC .................................. 439/598, 589, 587
See application file for complete search history.

(56) References Cited

U.S. PATENT DOCUMENTS

| | | | | |
|---|---|---|---|---|
| 3,601,526 A * | 8/1971 | Bohne | ................... | H01B 17/30 |
| | | | | 174/11 R |
| 3,780,204 A * | 12/1973 | Oliver | ................... | H01B 17/305 |
| | | | | 174/11 R |
| 3,882,262 A * | 5/1975 | Korner | ................ | G21C 17/116 |
| | | | | 174/11 R |
| 4,058,671 A * | 11/1977 | Panek | ................ | G21C 17/116 |
| | | | | 174/12 R |
| 4,420,456 A * | 12/1983 | Nickel | ................ | G21C 17/116 |
| | | | | 174/151 |
| 4,540,230 A * | 9/1985 | Iversen | ................ | H01R 13/521 |
| | | | | 439/277 |
| 4,909,751 A * | 3/1990 | Marolda, Jr. | ........ | H01R 13/523 |
| | | | | 439/273 |
| 5,051,103 A * | 9/1991 | Neuroth | ............. | E21B 33/0385 |
| | | | | 439/192 |
| 5,203,723 A | 4/1993 | Ritter | | |
| 5,493,073 A * | 2/1996 | Honkomp | ............ | H01B 17/305 |
| | | | | 174/152 GM |
| 5,588,086 A | 12/1996 | Fan | | |
| 6,332,787 B1 * | 12/2001 | Barlow | .............. | H01R 13/5227 |
| | | | | 439/138 |
| 6,475,008 B1 * | 11/2002 | Marolda | .............. | H01R 13/523 |
| | | | | 439/271 |
| 7,507,114 B2 * | 3/2009 | Kent | .................... | H01R 13/508 |
| | | | | 439/174 |
| 7,690,936 B1 | 4/2010 | Snekkevik et al. | | |
| 7,718,899 B2 * | 5/2010 | Benestad | ............... | H01B 17/30 |
| | | | | 174/152 R |
| 7,794,254 B2 * | 9/2010 | Marklove | .............. | H01R 13/521 |
| | | | | 439/271 |
| 7,959,454 B2 * | 6/2011 | Ramasubramanian | ..................... | H01R 13/03 |
| | | | | 439/201 |
| 8,483,530 B2 * | 7/2013 | Sorensen | ............ | H01R 13/523 |
| | | | | 385/111 |
| 8,708,727 B2 * | 4/2014 | Spahi | ................... | H01R 13/523 |
| | | | | 174/152 GM |
| 8,968,018 B2 * | 3/2015 | Sivik | ........................ | H02G 3/22 |
| | | | | 439/271 |
| 2004/0029443 A1 * | 2/2004 | Quadir | ................ | H01B 17/306 |
| | | | | 439/587 |
| 2008/0314616 A1 * | 12/2008 | Benestad | ............... | H01B 17/30 |
| | | | | 174/152 R |
| 2015/0288094 A1 | 10/2015 | Lerner et al. | | |

\* cited by examiner

PENETRATOR DEVICE FOR HIGH PRESSURE APPLICATION

PRIORITY STATEMENT

The present application hereby claims priority under 35 U.S.C. § 119 to European patent application number EP 16171939.8 filed May 30, 2016, the entire contents of which are hereby incorporated herein by reference.

FIELD

At least one embodiment of the present invention generally relates to high pressure and/or subsea penetrator devices.

BACKGROUND

In the above specified technical field, structure walls, such as walls in a high pressure and/or subsea environment, are penetrated by a conductor from the side of a high pressure environment to the side of a low pressure environment. "High" and "low" are relative terms, meaning that the pressure in the high pressure environment is higher than the pressure in the low pressure environment. The conductor may be, for example, an isolated electrical wire for conducting electric current or a sheathed optical fiber for conducting light.

Typically, the penetration through the structure wall is performed by way of penetrator devices. A penetrator device comprises a metallic body, which is mounted on an opening of the wall, and is provided with connecting passages through which the conductors pass. When the body of the penetrator device is connected to the opening in the wall, the high pressure environment and the low pressure environment are connectable through the connectors passing in the connecting passages. The connection and the sealing between the penetrator device and the wall are normally obtained by seals, welds, screw connections etc.

In the connecting passages of the penetrator device where the conductors pass, glass or a ceramic material inserts are provided between the conductor and the body of the penetrator for isolating the conductors from the metallic penetrator body and for providing a seal between the high pressure environment and the low pressure environment, along the connecting passages.

Design of the penetrator devices have been focused in providing a connection between environments characterized by a very high pressure difference. With the term "very high pressure difference" it is normally intended a working pressure difference of more than 1300 bar, with a design pressure difference of 3500 bar or above. This is particularly challenging considering that such very high pressure application requires a smaller penetrator, with respect to application for lower pressure differences.

SUMMARY

The inventors have recognized that current designs are not yet satisfactory or optimized for this type of applications. Particularly, the inventors have recognized that failures are subject to occur at the high pressure side of penetrator devices, where a connecting passage contacts an edge of a glass or ceramic material insert.

The inventors have further recognized that there is a need in the above defined technical field for providing a penetrator device, which overcomes all or part of the inconveniences of the known penetrator devices.

The claims describe advantageous developments and modifications of the invention.

According to a first embodiment of the invention, a penetrator device for high pressure and/or subsea applications is provided. The penetrator device comprises a body having:
a first end surface,
a second end surface distanced from the first end surface,
at least a connecting passage for connecting the first end surface to the second end surface, and
at least a groove extending from the first end surface towards the second end surface, the groove being distanced form second end surface and surrounding the connecting passage.

According to an embodiment of the invention, a penetrator device for high pressure and/or subsea applications comprises a body having:
a first end surface, which in operation is subject to a pressure of a high pressure environment,
a second end surface distanced from the first end surface, which in operation is subject to a pressure of a low pressure environment,
at least a connecting passage for connecting the first end surface to the second end surface,
at least a groove extending from the first end surface towards the second end surface, the groove being distanced from second end surface and surrounding the connecting passage and having an annular opening on the first end surface, and
annular lips between a first portion of connecting passage adjacent to first end surface and groove, wherein in operation annular lips are subject to the pressure of the high pressure environment, thus providing a pressure balance around the first portion of connecting passage.

BRIEF DESCRIPTION OF THE DRAWINGS

The aspects defined above and further aspects of the present invention are apparent from examples of embodiment to be described hereinafter and are explained with reference to the examples of embodiment. The invention will be described in more detail hereinafter with reference to examples of embodiments but to which the invention is not limited.

DETAILED DESCRIPTION OF THE EXAMPLE EMBODIMENTS

Figure 1:
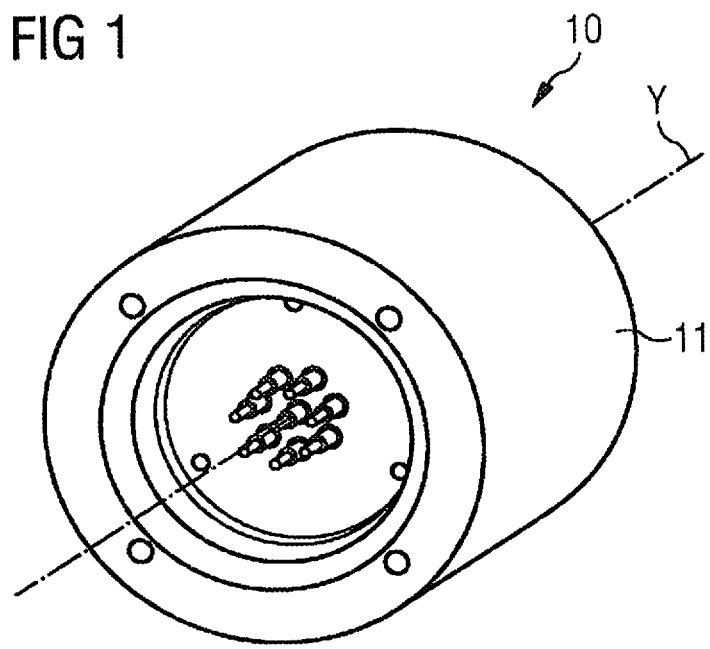
FIG. 1 shows an axonometric view of a penetrator device according to an embodiment of the present invention.
Figure 2:
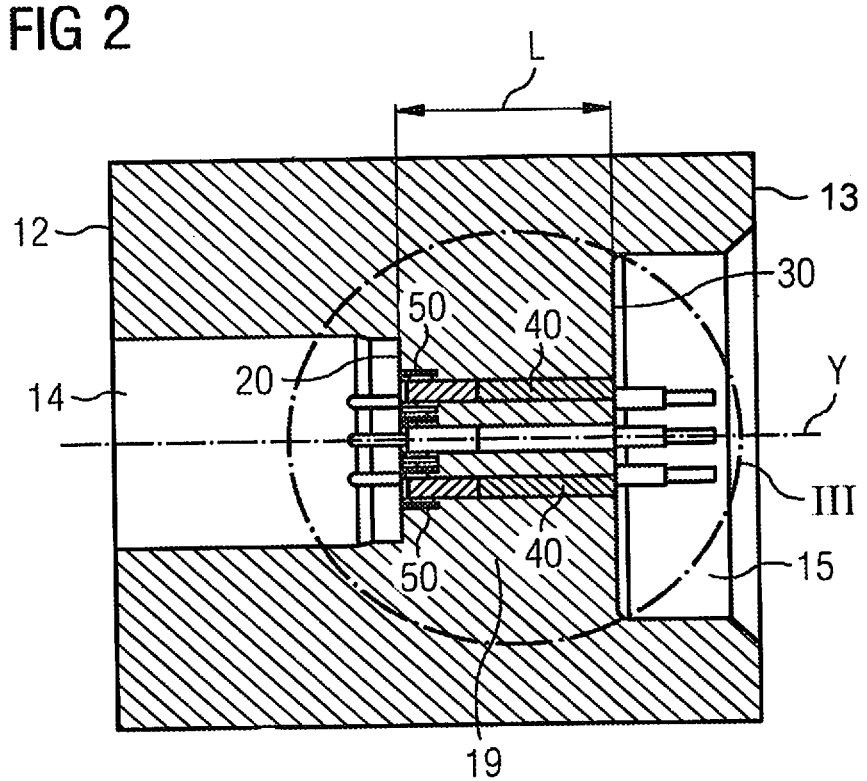
FIG. 2 shows an axial sectional view of the penetrator device of FIG. 1.
Figure 3:
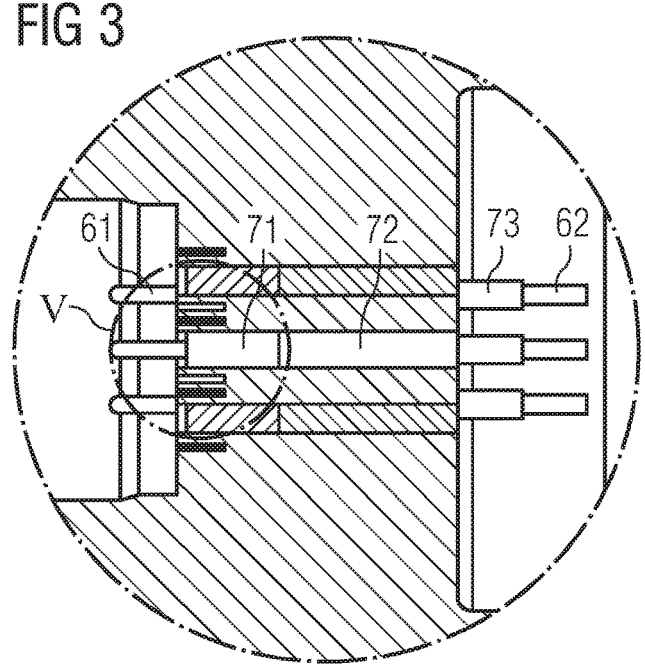
FIG. 3 shows a magnified view of the detail III of FIG. 2.
Figure 4:
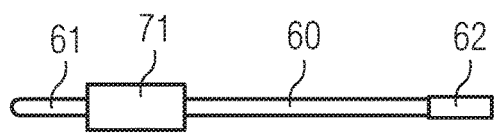
FIG. 4 shows a lateral view of a component of the penetrator device of FIG. 1.
Figure 5:
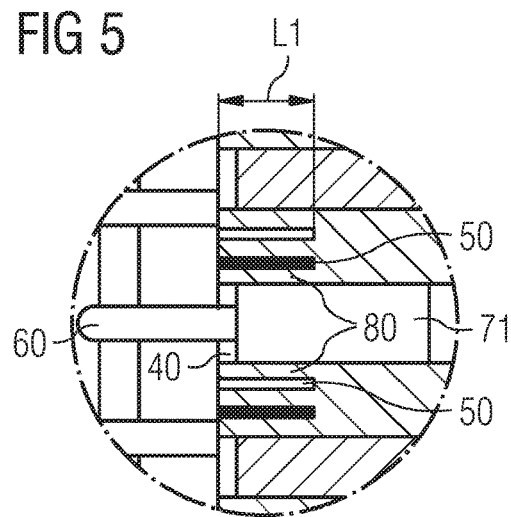
FIG. 5 shows a magnified view of the detail V of FIG. 3.

In the following, embodiments of the invention are described in detail with reference to the accompanying drawings. It is to be understood that the following description of the embodiments is given only for the purpose of illustration and is not to be taken in a limiting sense. It should be noted that the drawings are to be regarded as being schematic representations only, and elements in the drawings are not necessarily to scale with each other. Rather, the representation of the various elements is chosen such that their function and general purpose become apparent to a person skilled in the art.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. The present invention, however, may be embodied in many alternate forms and should not be construed as limited to only the example embodiments set forth herein.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

According to a first embodiment of the invention, a penetrator device for high pressure and/or subsea applications is provided. The penetrator device comprises a body having:
 a first end surface,
 a second end surface distanced from the first end surface,
 at least a connecting passage for connecting the first end surface to the second end surface, and
 at least a groove extending from the first end surface towards the second end surface, the groove being distanced form second end surface and surrounding the connecting passage.

In operation, when coupled to a structure wall separating a high pressure environment to the side of a low pressure environment, the first end surface is subject to the pressure in the high pressure environment, while the second end surface is subject to the pressure in the low pressure environment. As a result also the inside of the cavity is subject to the pressure in the high pressure environment. The pressure inside the groove creates a pressure balance around a first portion of the connecting passage, such first portion being adjacent to the high pressure environment. This prevents failures which may occur at the high pressure side of penetrator devices. A robust design is achieved, particularly, but not exclusively, in case of very high pressure difference between the high pressure environment and the low pressure environment and/or when penetrator device has reduced dimensions.

According to an embodiment of the present invention, the groove has a depth which is smaller than the length of the connecting passage, in a direction extending between the first end surface and second end surface.

According to another embodiment of the present invention, the groove has an annular opening on the first end surface. In particular, the connecting passage and the groove may be coaxial.

According to yet another embodiment of the present invention, the body of the penetrator device has a cylindrical shape the connecting passage and the groove being parallel to a longitudinal axis of the body of the penetrator device.

All the embodiments above described provide respective designs of the penetrator device, which advantageously and efficiently achieve a convenient pressure balance around the first portion of the connecting passage, adjacent to the high pressure environment.

According to an embodiment of the present invention, the penetrator device comprises a plurality of connecting passages and a plurality of grooves, each groove of the plurality of grooves surrounding a respective connecting passage of the plurality of connecting passages.

In a particular embodiment, the pluralities of connecting passages and of grooves may be regularly distributed around a longitudinal axis of the cylindrical body of the penetrator device.

According to another embodiment of the present invention, the penetrator device comprises at least a conductor inserted in a respective connecting passage and at least a first insulator interposed between the conductor and the body of the penetrator device. In particular, the first insulator may be a glass annular insulator. More in particular, the glass annular insulator may be adjacent, to the first end surface of the body of the penetrator device, in order to be, in operation, subject to the pressure of the high pressure environment.

Advantageously, this prevents failures which may occur at the high pressure side of penetrator devices, both in the body of the penetrator or in the glass annular isolator.

The illustrations in the drawings are schematically. It is noted that in FIGS. 1 to 9, similar or identical elements are provided with the same reference signs.

With reference to the embodiment of the attached FIGS. 1 to 9, a penetrator device 10 for high pressure and/or subsea applications comprises a cylindrical metal body 11.

According to other embodiment of the present invention (not shown), the body 11 of the penetrator device 10 may have a different shape or may be constituted in a different material.

The cylindrical body 11 extends longitudinally along a longitudinal axis Y, between a first circular base 12 and a second circular base 13. The circular bases 12, 14 are both orthogonal to the longitudinal axis Y. The cylindrical body 11 is also delimited by a peripheral cylindrical mantel, longitudinal extended between the circular bases 12, 14.

The cylindrical body 11 is in operation received in a cylindrical opening of a structure wall (not shown) for high pressure and/or subsea applications. The structure wall separates a high pressure environment from a low pressure environment. "High" and "low" are relative terms, meaning that the pressure in the high pressure environment is higher than the pressure in the low pressure environment. The cylindrical mantel is subject to couple with a corresponding cylindrical surface of the opening of the structure wall. In operation the cylindrical body 11 is oriented in such a way that the first circular base 12 is in communication with the high pressure environment and the second circular base 13 is in communication with the low pressure environment. The coupling between the cylindrical body 11 and the structure wall is not a specific object of the present invention and therefore not described in further detail.

The body 11 of the penetrator device 10 further comprises:
- a first axial cavity 14 extending coaxially to the longitudinal axis Y from the first circular base 12 up to a first end circular surface 20,
- a second axial cavity 15 extending coaxially to the longitudinal axis Y from the second circular base 13 up to a second end circular surface 30.

Both the first and the second end surfaces 20, 30 are orthogonal to the longitudinal axis Y.

According to other embodiment of the present invention (not shown), one or both of the first and the second end surfaces 20, 30 are not planar.

In operation the first end circular surface 20 is in communication with the high pressure environment and the second end circular surface 30 is in communication with the low pressure environment.

The first and the second axial cavity 14, 15 extends axially for a portion of the height of the cylindrical body 11, i.e. for a portion of the distance between the circular bases 12, 13, in such a way that a solid middle portion 19 of the body 11 separates the first end surface 20 from the second end surface 30. The solid middle portion 19 has a length L, measured along the longitudinal axis Y. Therefore, the length L is also the distance between the first end surface 20 and the second end surface 30.

The first and the second end surfaces 20, 30 are connected by a plurality of connecting passages 40, extending for the entire length L of the solid middle portion 19 of the body 11.

In the embodiment of the attached FIGS. 1 to 9, the connecting passages 40 are cylindrical through holes.

According to another embodiment of the present invention (not shown), the connecting passages 40 have a sectional shape different from the circular shape.

In the embodiment of the attached FIGS. 1 to 9, eight connecting passages 40 are provided. In particular:
- one connecting passage 40 coaxial with the longitudinal axis Y of the penetrator device 10 and
- seven connecting passages 40 parallel to the longitudinal axis Y and regularly distributed around the longitudinal axis Y.

According to another embodiment of the present invention (not shown), the connecting passages 40 may be provided in a different number or with any other distribution.

The penetrator device 10 comprises a plurality of conductors 60, each conductor 60 being inserted in a respective connecting passage 40. The conductors extends between a first end 61, which in operation is subject to protrude from the first end surfaces 20 in the first axial cavity 14, and a second end 62, which in operation is subject to protrude from the second end surfaces 30 in the second axial cavity 15.

According to respective embodiments of the present invention, each conductor 60 may be part of an electric line for conducting an electric current or of a sheathed optical fibre line for conducting light.

The penetrator device 10 comprises, around each of the conductors 60, a first glass annular insulator 71 and a second ceramic annular insulator 72. In operation, the first and the second annular insulator 71, 72 are interposed between the conductor 60 and the body 11 of the penetrator device 10. The first and the second annular insulator 71, 72 are axially adjacent to each other and, in operation, are arranged in each connecting passage 40 in such a way that the first insulator 71 is oriented towards the first end surface 20 and the second insulator 72 is oriented towards the second end surface 30.

The first and the second annular insulator 71, 72 provide insulation between the conductors 60 and the body 11 of the penetrator device 10. The first and the second annular insulator 71, 72 further provide a sealing between the high pressure environment and the low pressure environment.

In operation, a third annular insulator 73 is provided around the second end 62 of each of the conductors 60. The third annular insulator 73 protrudes from the second end surfaces 30 into the second axial cavity 15.

The body 11 of the penetrator device 10 comprises a grounding cavity 65 for a grounding pin 66, providing a grounding connection between the body 11 and, for example, an electrical line, which includes the conductors 60.

The grounding cavity 65 is cylindrical and extends parallel to the longitudinal axis Y from the first end surface 20 towards the second end surface 30. The depth of the grounding cavity 65 is smaller than the length L of the solid middle portion 19 of the body 11. In operation, a grounding insulator 77 is provided between the grounding pin 66 and the grounding cavity 65.

The grounding cavity 65 is positioned at a distance from the longitudinal axis Y of penetrator device 10 which is greater than the distance between the longitudinal axis Y and any of the connecting passages 40.

The body 11 of the penetrator device 10 comprises a plurality of grooves 50 extending from the first end surface 20 towards the second end surface 30. Each groove 50 has a depth L1, measured along the longitudinal axis Y which is smaller than the length L of the connecting passages 40. The grooves 50, differently from the connecting passages 40, do not connect the first and the second end surfaces 20, 30 and are therefore distanced from the second end surface 30.

Figure 6:
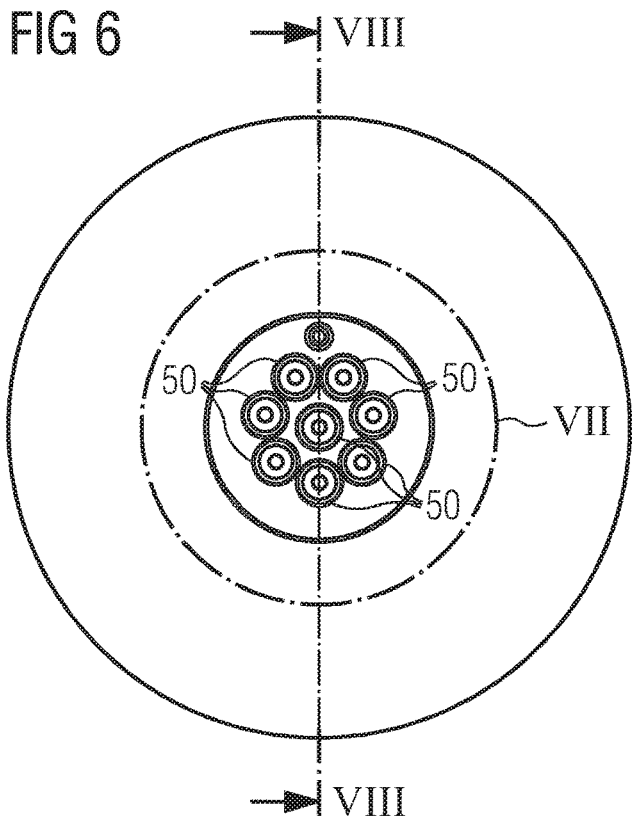
FIG. 6 shows a side view of the penetrator device of FIG. 1.
Figure 7:
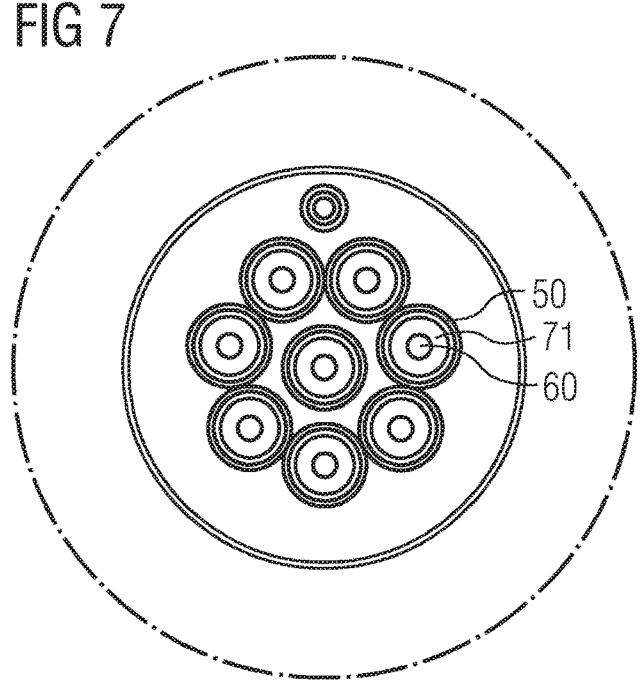
FIG. 7 shows a magnified view of the detail VII of FIG. 6.
Figure 8:
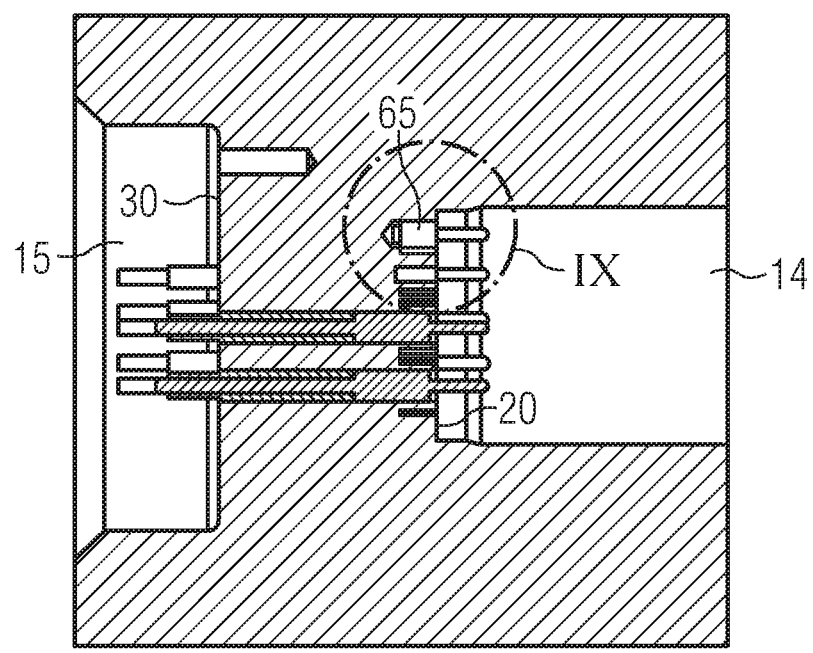
FIG. 8 shows a sectional view of the penetrator device according to an embodiment of the present invention, taken along the sectional line VIII-VIII of FIG. 7.
Figure 9:
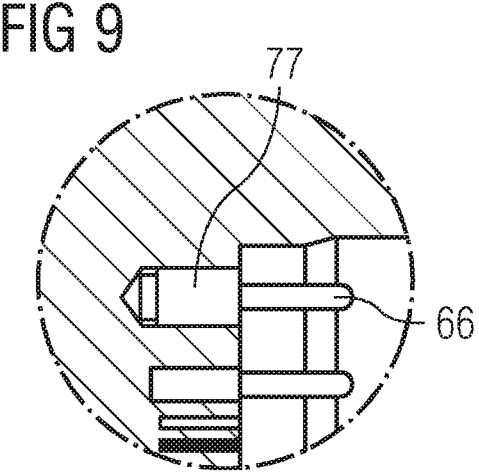
FIG. 9 shows a magnified view of the detail IX of FIG. 8.

On the first end surface 20 (FIGS. 6 and 7, the each groove 50 has an annular opening, which is coaxial with a respective connecting passage 40. Considering the specific orientation of the connecting passages 40 of the embodiment of the attached figures, each the groove 50 is also parallel or coaxial to the longitudinal axis Y of the body 11 of the penetrator device 10.

Between a first portion (having length L1) of each connecting passage 40 adjacent to the first end surface 20 and the respective groove 50, the body 11 comprises respective annular lips 80. In operation, the annular lips 80 are subject to the pressure of the high pressure environment, thus providing a pressure balance around the first portion (having length L1) of each connecting passage 40, in particular around the first glass insulator 71.

The patent claims of the application are formulation proposals without prejudice for obtaining more extensive patent protection. The applicant reserves the right to claim even further combinations of features previously disclosed only in the description and/or drawings.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A penetrator device for at least one of high pressure and subsea applications comprising:
    a body, the body including
        a first end surface, subjectable, in operation, to a pressure of a high pressure environment,
        a second end surface, distanced from the first end surface and subjectable, in operation, to a pressure of a low pressure environment,
        at least one connecting passage to connect the first end surface to the second end surface,
        at least one groove extending from the first end surface towards the second end surface, the groove being distanced from the second end surface, surrounding and coaxial with the at least one connecting passage and including an annular opening on the first end surface, the at least one first groove being subjected, in operation, to a pressure of the high pressure environment, and
        annular lips between a first portion of the at least one connecting passage adjacent to the first end surface and the at least one groove, wherein in operation, the annular lips are subject to the pressure of the high pressure environment, thus providing a pressure balance around the first portion of connecting passage.

2. The penetrator device of claim 1, wherein, in a direction extending between the first end surface and second end surface, the at least one groove including a depth relatively smaller than a length of the at least one connecting passage.

3. The penetrator device of claim 1, wherein the annular opening of the at least one groove is only in the first surface and does not penetrate through the second end surface.

4. The penetrator device of claim 2, wherein the body of the penetrator device includes a cylindrical shape, the at least one connecting passage and the at least one groove being parallel to a longitudinal axis of the body of the penetrator device.

5. The penetrator device of claim 2, wherein the at least one connecting passage includes a plurality of connecting passages and the at least one groove includes a plurality of grooves, each groove of the plurality of grooves surrounding a respective connecting passage of the plurality of connecting passages.

6. The penetrator device of claim 5, wherein the plurality of connecting passages and the plurality of grooves are regularly distributed around a longitudinal axis of the body of the penetrator device.

7. The penetrator device of claim 2, further comprising:
    at least one conductor, inserted in the at least one connecting passage, and
    at least one first insulator, interposed between the at least one conductor and the body of the penetrator device.

8. The penetrator device of claim 7, wherein the first insulator is a glass annular insulator.

9. The penetrator device of claim 7, further comprising:
    at least one second insulator, axially adjacent to the at least one first insulator, the at least one first insulator and the at least one second insulator being arranged in the at least one connecting passage such that the at least one first insulator is oriented towards the first end surface and the at least one second insulator is oriented towards the second end surface.

10. The penetrator device of claim 1, wherein the body further includes:
    a first axial cavity extending from the first end surface to a first base end of the body; and
    a second axial cavity extending from the second end surface to a second base end of the body.

11. The penetrator device of claim 1, wherein the first axial cavity and the second axial cavity extend axially for a portion of a height of the body.

12. The penetrator device of claim 1, wherein the at least one connecting passage includes a plurality of connecting passages and the at least one groove includes a plurality of grooves, each groove of the plurality of grooves surrounding a respective connecting passage of the plurality of connecting passages.

13. The penetrator device of claim 12, wherein the plurality of connecting passages and the plurality of grooves are regularly distributed around a longitudinal axis of the body of the penetrator device.

14. The penetrator device of claim 1, wherein the at least one connecting passage includes at least eight connecting passages including at least one connecting passage coaxial with a longitudinal axis of the penetrator device and at least seven connecting passages parallel to the longitudinal axis and regularly distributed around the longitudinal axis.

15. The penetrator device of claim 14, wherein the plurality of connecting passages and the plurality of grooves are regularly distributed around a longitudinal axis of the body of the penetrator device.

16. The penetrator device of claim 3, wherein the body of the penetrator device includes a cylindrical shape, the at least one connecting passage and the at least one groove being parallel to a longitudinal axis of the body of the penetrator device.

17. The penetrator device of claim 3, wherein the at least one connecting passage includes a plurality of connecting passages and the at least one groove includes a plurality of grooves, each groove of the plurality of grooves surrounding a respective connecting passage of the plurality of connecting passages.

18. The penetrator device of claim 17, wherein the plurality of connecting passages and the plurality of grooves are regularly distributed around a longitudinal axis of the body of the penetrator device.

19. The penetrator device of claim 8, further comprising:
    at least one second insulator, axially adjacent to the at least one first insulator, the at least one first insulator and the at least one second insulator being arranged in the at least one connecting passage such that the at least one first insulator is oriented towards the first end surface and the at least one second insulator is oriented towards the second end surface.

\* \* \* \* \*